United States Patent
Balakrishnan et al.

(10) Patent No.: US 10,148,429 B2
(45) Date of Patent: *Dec. 4, 2018

(54) SYSTEM AND METHOD FOR RECOVERY KEY MANAGEMENT

(71) Applicant: Dell Products L.P., Round Rock, TX (US)

(72) Inventors: Viswanathan Balakrishnan, Bangalore (IN); Santosh Bhadri, Bangalore (IN); Mukund P. Khatri, Austin, TX (US); Kevin T. Marks, Round Rock, TX (US); Narayanan Subramaniam, Bangalore (IN); Venkatesan Balakrishnan, Tamil Nadu (IN)

(73) Assignee: Dell Products L.P., Round Rock, TX (US)

( * ) Notice: Subject to any disclaimer, the term of this patent is extended or adjusted under 35 U.S.C. 154(b) by 12 days.

This patent is subject to a terminal disclaimer.

(21) Appl. No.: 15/342,343

(22) Filed: Nov. 3, 2016

(65) Prior Publication Data

US 2017/0063539 A1  Mar. 2, 2017

Related U.S. Application Data

(63) Continuation of application No. 14/528,758, filed on Oct. 30, 2014, now Pat. No. 9,520,998, which is a continuation of application No. 12/424,787, filed on Apr. 16, 2009, now Pat. No. 8,923,520.

(51) Int. Cl.
*H04L 9/08* (2006.01)
*G06F 21/57* (2013.01)
*G06F 11/14* (2006.01)
*H04L 9/32* (2006.01)

(52) U.S. Cl.
CPC ........ *H04L 9/0816* (2013.01); *G06F 11/1402* (2013.01); *G06F 21/575* (2013.01); *H04L 9/3223* (2013.01); *H04L 9/3236* (2013.01)

(58) Field of Classification Search
CPC .... G06F 21/575; H04L 9/0816; H04L 9/3236
USPC ......................................... 713/193; 380/286
See application file for complete search history.

(56) References Cited

U.S. PATENT DOCUMENTS

| | | | |
|---|---|---|---|
| 6,009,524 A * | 12/1999 | Olarig ................... | G06F 21/445 709/225 |
| 7,216,369 B2 | 5/2007 | Wiseman et al. | |
| 7,254,722 B2 | 8/2007 | Catherman et al. | |
| 7,275,263 B2 | 9/2007 | Bajikar et al. | |
| 7,711,942 B2 * | 5/2010 | Wang .................... | G06F 21/575 713/2 |

(Continued)

*Primary Examiner* — Samson B Lemma
(74) *Attorney, Agent, or Firm* — Baker Botts L.L.P.

(57) ABSTRACT

A system and method for managing the recovery key of a computer system is disclosed. The computer system includes a security layer, and the recovery key is stored locally to a memory location on the computer system, including, as examples, flash memory on the motherboard of the computer system or a USB port on the computer system. In operation, when it becomes necessary for the computer system to authenticate the recovery key, the recovery key may be retrieved from the local memory. The retrieval and storage of the recovery key may be managed by a remote administrator. The recovery key may be stored in a hidden partition in the storage location, and the recovery key may be cryptographically wrapped to add an additional layer of security.

20 Claims, 3 Drawing Sheets

(56) References Cited

U.S. PATENT DOCUMENTS

| | | | |
|---|---|---|---|
| 7,725,703 B2 * | 5/2010 | Hunter | G06F 21/575 |
| | | | 380/259 |
| 8,041,960 B2 | 10/2011 | Kelly et al. | |
| 2006/0161769 A1 | 7/2006 | Hunter et al. | |
| 2008/0025513 A1 | 1/2008 | Lietzke et al. | |
| 2008/0059799 A1 | 3/2008 | Scarlata | |
| 2009/0036096 A1 * | 2/2009 | Ibrahim | H04L 63/083 |
| | | | 455/411 |
| 2009/0210456 A1 * | 8/2009 | Subramaniam | G06F 21/57 |
| 2009/0300348 A1 * | 12/2009 | Aciicmez | H04L 63/08 |
| | | | 713/156 |
| 2010/0022217 A1 | 1/2010 | Ketari | |
| 2012/0151223 A1 * | 6/2012 | Conde Marques | G06F 21/575 |
| | | | 713/193 |
| 2014/0040605 A1 * | 2/2014 | Futral | G06F 9/445 |
| | | | 713/2 |

* cited by examiner

SYSTEM AND METHOD FOR RECOVERY KEY MANAGEMENT

CROSS REFERENCES TO RELATED APPLICATIONS

This application is a continuation application of U.S. patent application Ser. No. 14/528,758 filed Oct. 30, 2014, which claims priority to U.S. patent application Ser. No. 12/424,787 filed Apr. 16, 2009 and now U.S. Pat. No. 8,923,520 granted Dec. 30, 2014, which claims priority to Indian Patent Application No. 235/DEL/2009 filed on Feb. 6, 2009, all of which are incorporated herein by reference in their entirety for all purposes.

TECHNICAL FIELD

The present disclosure relates generally to computer systems and information handling systems, and, more particularly, to a system and method for recovery key management.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

An information handling system may be configured according to the Trusted Platform Module (TPM) specification and may include a TPM processor. A computer system that is TPM-enabled includes a layer of internal security that intended to prevent unauthorized access and modifications to the computer system. In operation, a TPM processor, which is typically located on the motherboard of a computer system, will perform cryptographic authentication of a cryptographic key. Depending on the configuration of the computer system, authentication of a key by the TPM processor may be necessary before the system can complete a boot, whether such boot occurs after a normal shutdown or a failure condition. Authentication of a key after a normal shutdown may also be necessary when changes are made to the hardware or software configuration of the computer system.

In the event of a failure or a reconfiguration of a TPM-enabled computer system, the user or administrator of the computer system will have to provide the key for computer system, sometimes referred to as a recovery key, in order to complete the boot of the computer system. In an enterprise computing environment, it is difficult for a single administrator to manage the keys for multiple computer systems, which may be located distant from the physical location of the administrator.

SUMMARY

In accordance with the present disclosure, a system and method for managing the recovery key of a computer system is disclosed. The computer system includes a security layer, and the recovery key is stored locally to a memory location on the computer system, including, as examples, flash memory on the motherboard of the computer system or through a USB port on the computer system. In operation, when it becomes necessary for the computer system to authenticate the recovery key, the recovery key may be retrieved from the local memory. The retrieval and storage of the recovery key may be managed by a remote administrator. The recovery key may be stored in a hidden partition in the storage location, and the recovery key may be cryptographically wrapped to add an additional layer of security.

The system and method disclosed herein is technically advantageous because it provides for more efficient and more secure management of the security layer of a computer system. With respect to the efficient management of the security layer of a computer system, the recovery key for the security layer can be stored on the computer system itself and accessed through a remote administrator, thereby removing from the remote administrator the necessity of immediately possessing every recovery key for every computer system managed by the remote administrator. The system and method described herein is also technically advantageous in that the recover key is stored to a partition in the memory of the computer system, and the partition may be hidden or unhidden through memory mapping to control access to the security key. In addition, the remote administrator may cryptographically wrap the security key. Cryptographically wrapping the security key provides an additional layer of security for the key storage of the key locally to the computer system. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
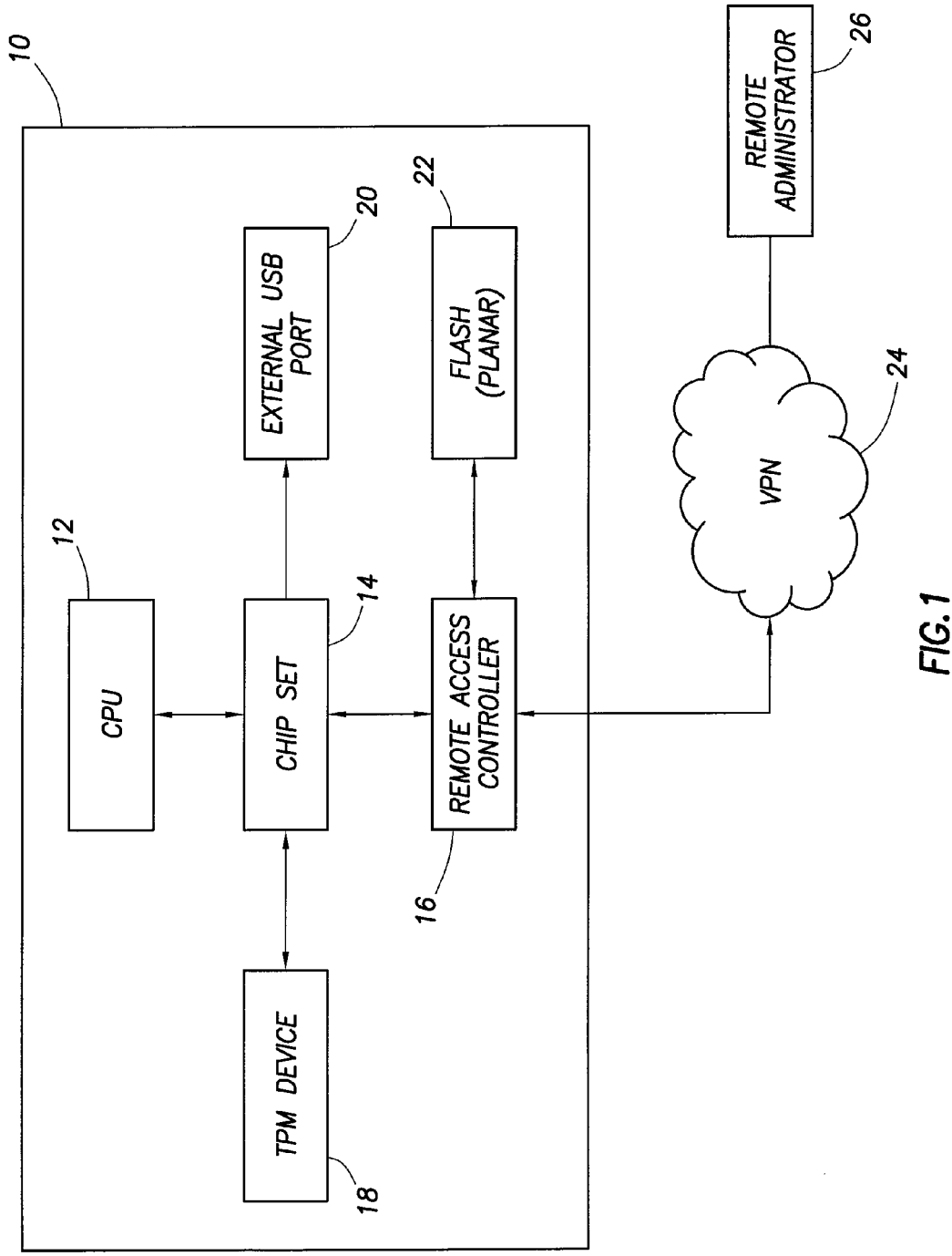
FIG. 1 is a diagram of the security and remote access elements of a computer system.

Shown in FIG. 1 is a diagram of an information handling system or computer system, which is indicated generally at 10. FIG. 1 includes the layout of the security and remote access elements of the computer system. Computer system 10 includes a processor or CPU 12 that is coupled to a chip set 14. Chip set 14 is coupled to a TPM device 18, a remote access controller 16, and an external USB port 20. Remote access controller 16 is also coupled to an on-board memory 22, which is shown in FIG. 1 as flash memory. A remote administrator 26 is coupled through a virtual private network 24 to remote access controller 16.

In operation, TPM device 18 includes processing capability and performs a cryptographic authentication of a key. The authentication of the key will occur as part of the boot of the computer system. Depending on the configuration of the computer system, key authentication may also be necessary following a modification to the hardware or software configuration of the computer system. The key, which is sometimes referred to as a recovery key, can be provided to the TPM device through the USB port 20, either locally or remotely by the remote administrator through remote access controller 16. As an alternative or in addition to providing the recovery key through external USB port 20 or through remote access controller 16, the recovery key may be stored in local memory in the computer system, such as planar memory 22.

Figure 2:
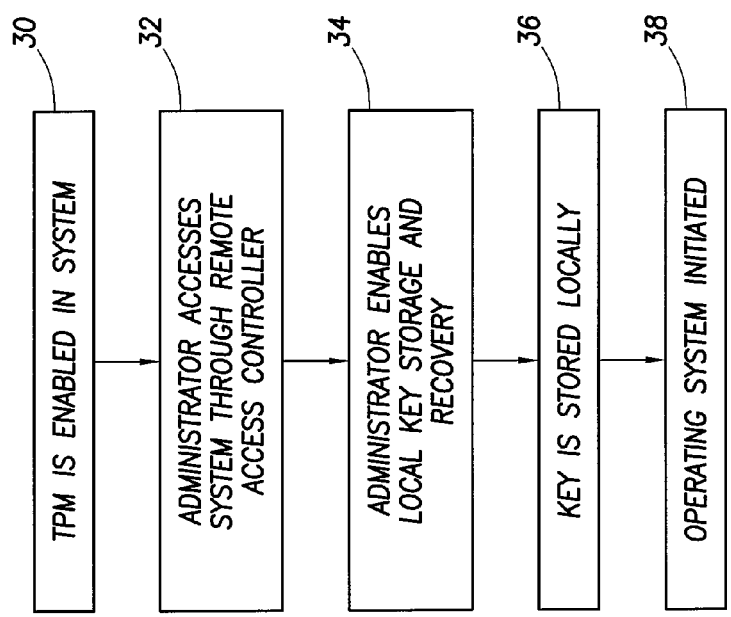
FIG. 2 is a flow diagram of a method for remotely storing a recovery key in a computer system in a manner that is accessible to a remote administrator.

Shown in FIG. 2 is a series of method steps for remotely storing a recovery key in the computer system in a manner that is accessible to the remote administrator. At step 30, the TPM security system is implemented and enabled in the computer system. At step 32, remote administrator 26 accesses the computer system through remote access controller 16. The access may occur as part of the computer system's boot process. As part of the boot process, the remote administrator can access the BIOS of the computer system. The remote administrator next establishes a flag in the BIOS of the computer system that permits the recovery key to be stored locally on the memory 22 of the computer system. At step 36, the remote administrator saves the key locally to the memory 22.

Memory 22 may be partitioned and the recovery key may be stored to a designated partition in memory 22. At step 38, the boot of the computer system continues and the operation system of the computer system is initiated. Because the recovery key for the TPM layer of the computer system is stored locally in the computer system, the remote administrator can access the recovery key for the computer system securely stored in local memory. Thus, it is not necessary for the remote administrator to have the recovery key in its immediate possession for every computer system being managed by the computer system.

Figure 3:
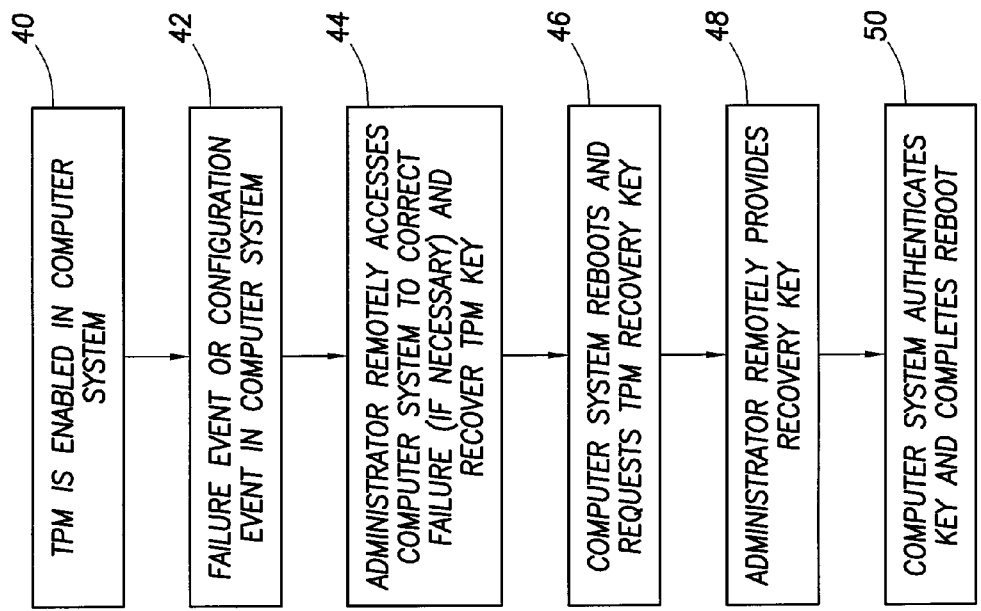
FIG. 3 is a flow diagram of a method for providing a recovery key in a computer system.

Shown in FIG. 3 is a flow diagram of a series of method steps for providing a recovery key in a computer system. At step 40, a TPM security system is implemented and enabled in the computer system. At step 42, a failure event or a configuration event occurs in the computer system. A failure event is any event in which the operation of the computer system ends unexpectedly, and a reconfiguration event is an event that involves a configuration change to the hardware or software of the computer system. Both failure events and reconfiguration events require that the TPM recovery key of the computer system be authenticated by the TPM device. At step 44, remote administrator 26 accesses the computer system. As part of the remote access, the remote administrator may perform, if necessary, a diagnostic and repair routine at the computer system. The remote administrator 26 will also acquire the TPM recovery key from memory 22.

At step 46 of FIG. 3, as part of the boot of the computer system following the failure event or reconfiguration event, the TPM security layer of the computer system will request the recovery key. The remote administrator provides the recovery key at step 48. The recovery key of step 48 is the same recovery key is the key that the remote administrator previously recovered from the memory 22 of the computer system. The computer system authenticates the recover key at the TPM device 18 and the computer system completes its reboot. Thus, the remote administrator was able to manage the security of a computer system with a key that was stored locally to the computer system, without the necessity of the remote administrator having possession of the key before the remote administrator access the computer system.

Figure 4:
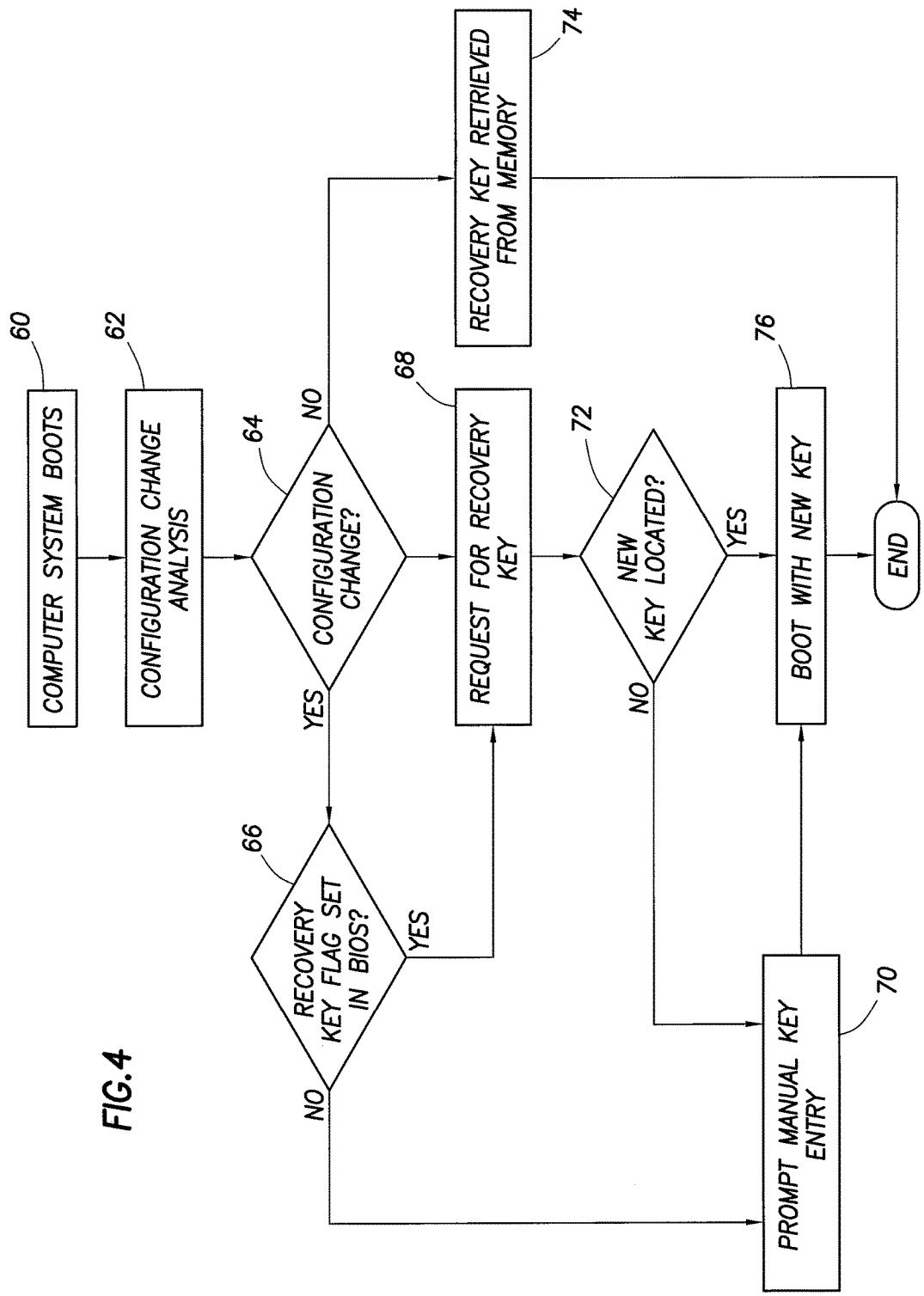
FIG. 4 is a flow diagram of method for booting a secure computer system, including a determination of whether a new recovery key is necessary and, if necessary, the retrieval of that key for authentication.

Shown in FIG. 4 is a flow diagram of a series of method steps for booting a secure computer system, including a determination of whether a new recovery key is necessary and, if necessary, the retrieval of that key for authentication. At step 60, the computer system is booted. At step 62, the BIOS determines if there has been a configuration change to the computer system since the time of the most recent boot of the computer system. The determination may be performed through a hash analysis in which a hash code representing the previous configuration is compared against a hash code of the current configuration of the computer system. If it is determined at step 64 that the configuration of the computer system is not changed, the flow diagram branches to step 74, where the preexisting recovery key is recovered from memory 22 or port 20 and used to authenticate the computer system for the remainder of the boot.

If it is determined at step 64 that a configuration change has occurred, the flow diagram continues at step 66, where it is determined if a Recovery_Key_Needed flag is set in the BIOS of the computer system. If the hardware or software of the computer system has been modified since the time of the most recent boot of the computer system, a Recovery_Key_Needed flag is set in the BIOS following the hardware or software modification and before the next boot of the computer system. If it is determined at step 66 that the Recovery_Key_Needed flag is set in the BIOS, the BIOS will request that the remote administrator provide the new recovery key at step 68. The remote administrator will save the new recovery key to memory 22. The remote administrator could also provide a new recovery key through a USB drive coupled to USB port 20. The BIOS will search for the new recovery key in these locations, if the BIOS locates the new key (step 72), the BIOS boots authenticates the new recovery key and completes the boot process at step 76. If the BIOS is unable locate the new key, or if the Recovery_Key_Needed flag is not set in the BIOS, the BIOS prompts the remote administrator to enter the key manually at step 70, followed by the authentication of the key and the boot of the computer system at step 76.

As described with respect to the boot process of FIG. 4, the existing recovery key and any new recovery key can saved to storage in or associated with the computer system. For example, the recovery key can be saved to memory 22, which may be flash memory, or to an embedded USB port. Other options for storing the recovery key include an external USB port.

In operation, the recovery key could be stored in a partitioned region of its storage location (recovery key partition), and the remote administrator would be able to hide or unhide the recovery key in its storage location. To hide or unhide the recovery key partition in its storage location, the remote administrator would remotely communicate with the computer system to issue a suitable memory mapping command that would expose or conceal the recovery key partition. A remote administrator password would be required for the remote administrator to hide or unhide the recovery key partition.

As a further security measure, the recovery key that is stored locally on the computer system can be cryptographically wrapped within another cryptographic key. A key wrapping function can be applied by the remote administrator to create a key that must be cryptographically transformed by the remote administrator before the key can be authenticated by the TPM device on the computer system. Thus, the recovery key that is stored locally to the computer system would be cryptographically wrapped, and must be unwrapped by the remote administrator for recovery, thereby providing another layer of security to the computer system. With respect to the process flows set out in FIGS. 2-4, if the key is stored to the computer system in a wrapped stated, the key would have to be cryptographically unwrapped by the remote administrator before the key could be authenticated by the TPM device.

The system and method described here is technically advantageous because it provides for more efficient and more secure management of the security layer of a computer system. With respect to the efficient management of the security layer of a computer system, the recovery key for the security layer can be stored on the computer system itself and accessed through a remote administrator, thereby removing from the remote administrator the necessity of immediately possessing every recovery for every computer system managed by the remote administrator. The system and method described herein is also technically advantageous in that the recover key is stored to a partition in the memory of the computer system, and the partition may be hidden or unhidden through memory mapping to control access to the security key. In addition, the remote administrator may cryptographically wrap the security key. Cryptographically wrapping the security key provides an additional layer of security for the key storage of the key locally to the computer system. Although memory element 22 is described herein in terms of flash memory, it should be understood that other memory configuration could be employed included an internal or external USB key. Although the present disclosure has been described in detail, it should be understood that various changes, substitutions, and alterations can be made hereto without departing from the spirit and the scope of the invention as defined by the appended claims.

What is claimed is:

1. A method for managing a security layer of a computer system, wherein the computer system includes a security layer that requires authentication of a key, comprising:
   identifying a change to a configuration of the computer system;
   determining if a configuration change to the computer system has occurred since the last boot based on a hash analysis, wherein the hash analysis compares a first hash code representing a previous hardware or software configuration of the computer system and a second hash code representing a current hardware or software configuration of the computer system;
   requesting a new key for authentication of the computer system based on the determination of the configuration change; and
   providing the new key through a storage location associated with the computer system, wherein providing the new key comprises receiving a memory mapping command to hide a partition of the storage location comprising the new key.

2. The method for managing the security layer of the computer system of claim 1, wherein the partition is designated for storage of the new key.

3. The method for managing the security layer of the computer system of claim 1, wherein the step of providing the new key comprises the step of providing the new key through a remote administrator.

4. The method for managing the security layer of the computer system of claim 1, wherein the step of providing the new key comprises the step of cryptographically unwrapping the new key before providing the new key for authentication.

5. The method for managing the security layer of the computer system of claim 1, wherein the storage location is flash memory internal to the computer system.

6. The method for managing the security layer of the computer system of claim 1, further comprising:
   setting a flag indicative of the determination of the configuration change; and
   wherein the new key is requested based, at least in part, on the flag.

7. The method for managing the security layer of the computer system of claim 1, wherein the flag is a BIOS flag.

8. The method for managing the security layer of the computer system of claim 1, further comprising authenticating the new key.

9. A system for managing a security layer of a computer system, comprising:
   at least one processor; and
   a non-transitory memory coupled to the at least one processor, wherein the non-transitory memory includes one or more software components that, when executed by the at least one processor, cause the at least one processor to:
      identify a change to a configuration of the computer system;
      determine if a configuration change to the computer system has occurred since the last boot based on a hash analysis, wherein the hash analysis compares a first hash code representing a previous hardware or software configuration of the computer system and a second hash code representing a current hardware or software configuration of the computer system;
      request a new key for authentication of the computer system based on the determination of the configuration change; and provide the new key through a storage location associated with the computer system, wherein providing the new key comprises receiving a memory mapping command to hide a partition of the storage location comprising the new key.

10. The system for managing a security layer of a computer system of claim 9, wherein the partition of the storage location is designated for storage of the new key.

11. The system for managing a security layer of a computer system of claim 9, wherein the step of providing the new key comprises the step of providing the new key through a remote administrator.

12. The system for managing a security layer of a computer system of claim 9, wherein the step of providing the new key comprises the step of cryptographically unwrapping the new key before providing the new key for authentication.

13. The system for managing a security layer of a computer system of claim 9, wherein the storage location is flash memory internal to the computer system.

14. The system for managing a security layer of a computer system of claim 9, wherein the one or more software components further cause the at least one processor to:
    set a flag indicative of the determination of the configuration change; and
    wherein the new key is requested based, at least in part, on the flag.

15. The system for managing a security layer of a computer system of claim 9, further comprising authenticating the new key.

16. A non-transitory computer readable medium storing one or more software components that, when executed, cause a processor to:
    identify a change to a configuration of the computer system;
    determine if a configuration change to the computer system has occurred since the last boot based on a hash analysis, wherein the hash analysis compares a first hash code representing a previous hardware or software configuration of the computer system and a second hash code representing a current hardware or software configuration of the computer system; and
    request a new key for authentication of the computer system based on the determination of the configuration change; and
    provide the new key through a storage location associated with the computer system, wherein providing the new key comprises receiving a memory mapping command to hide a partition of the storage location comprising the new key.

17. The non-transitory computer-readable medium of claim 16, the partition of the storage location is designated for storage of the new key.

18. The non-transitory computer-readable medium of claim 16, wherein the step of providing the new key comprises the step of providing the new key through a remote administrator.

19. The non-transitory computer-readable medium of claim 16, wherein the step of providing the new key comprises the step of cryptographically unwrapping the new key before providing the new key for authentication.

20. The non-transitory computer-readable medium of claim 16, wherein the one or more software components, when executed, further cause the processor to:
    set a flag indicative of the determination of the configuration change; and
    wherein the new key is requested based, at least in part, on the flag.

* * * * *